United States Patent [19]

Suzuki

[11] Patent Number: 5,740,081
[45] Date of Patent: Apr. 14, 1998

[54] METHOD OF CORRECTING A DEVIATION OF A TOOL POSITION IN A MACHINE TOOL

[75] Inventor: Ryuji Suzuki, Yamanashi, Japan

[73] Assignee: Fanuc Ltd., Yamanashi, Japan

[21] Appl. No.: 552,010

[22] Filed: Nov. 2, 1995

[30] Foreign Application Priority Data

Nov. 4, 1994 [JP] Japan .................................. 6-293664

[51] Int. Cl.$^6$ ........................................................ G01K 5/00
[52] U.S. Cl. ................ 364/559; 364/474.01; 364/474.16; 364/474.35
[58] Field of Search ........................... 364/559, 474.01, 364/474.16, 474.31, 474.35

[56] References Cited

U.S. PATENT DOCUMENTS 5,444,640  8/1995  Hirai .................. 364/474.35
5,513,113  4/1996  Okada et al. ........ 364/474.21

Primary Examiner—Ellis S. Ramirez
Assistant Examiner—Patrick Assovad
Attorney, Agent, or Firm—Staas & Halsey

[57] ABSTRACT

A deviation correcting method for a machine tool, which is capable of exactly correcting a deviation of a reference position of a tool with respect to a workpiece without repeatedly executing a measuring operation. The measuring operation includes providing a detector switch SW for detecting an operating end surface of the tool, obtaining a position z when the detector switch SW detects the operating end surface of the tool, and calculating a difference between the detected position z and a reference position z0 to obtain an amount of deviation A. This measuring operation is performed at least three times at an arbitrary time interval. Based on data of these actual measurements, a function f(Ti) of a curve representing a relationship between a time Ti and an amount of deviation A. Then, an amount of deviation A' at an arbitrary time point Ti is estimated using the function f(Ti) to correct a commanded position of the tool. Since the deviation can be corrected by the estimated the amount of deviation A', it is unnecessary to repeatedly executing the measuring operation, thus improving the machining efficiency.

5 Claims, 7 Drawing Sheets

METHOD OF CORRECTING A DEVIATION OF A TOOL POSITION IN A MACHINE TOOL

BACKGROUND OF THE INVENTION

1. Field of the Invention

The present invention relates to a method of correcting a deviation of a reference position of a tool with respect to a workpiece in a machine tool.

2. Description of Related Art

In a machine tool, it is very difficult to perfectly correct a deviation of a reference position of a tool with respect to a workpiece even if the machine tool itself has a high rigidity and a backlash of a driving system is adequately compensated. The deviation is caused, for example, by the change in size and posture (bending) of mechanical components in expansion/shrinkage for thermal factor, such as heat generated by a friction of feed screws, heat generated by the drive of a motor, heat transferred from a control unit and change of atmospheric temperature, by an attachment error in changing the tool with a new one, and by abrasion of the tool.

The change in size and posture of mechanical components due to thermal causes may be solved by a known method of reducing the heat generation by cooling liquid or air flowing into the main components including feed screws. However, an apparatus for carrying out this known method is complex in structure, and if the apparatus is small in size, it is impossible to secure a sufficient space for accommodating a cooling mechanism. Further, this method can not cope with an attachment error due to change of the tool and with abrasion of the tool.

In an attempt to exactly correct the deviation, it has been proposed to measure the distance between the workpiece-attaching surface and the operating surface of the tool and to reflect its value in a correcting value for correcting the deviation. In an actual machining, since the temperature of the individual mechanical components varies all the time for thermal causes, such as heat generated by the friction of feed screws, heat generated by the motor, heat transferred from the control unit and change of atmospheric temperature, it is necessary to repeatedly measure a distance between the workpiece-attaching surface and the operating surface of the tool to amend the correcting value for an accurate correcting operation. In the above measuring process, the operating surface of the tool is brought in contact with the detector provided on the workpiece-attaching surface and each axial position of the tool is measured when the detector detects the operating surface of the tool. Then, a difference between the measured value of each axial position and the reference position is obtained to modify the correcting value. In order for accurate measurement, it is necessary to move the tool at a minute speed into contact with the detector, and the measuring operation takes a long time. As a result, the repeated measuring operation would increase the whole machining period of time.

SUMMARY OF THE INVENTION

It is an object of the present invention to provide a deviation correcting method for a machine tool, which is capable of exactly correcting a deviation of a reference position of a tool with respect to a workpiece without repeatedly executing the time-consuming operation of measuring.

According to a first aspect of the invention, a deviation correcting method comprises the steps of: providing a detector for detecting an operating surface of the tool on the table; measuring a relative position of the tool with respect to the table when the operating surface of the tool is detected by the detector under a predetermined standard condition and storing the measured position as a reference position; measuring a relative position of the tool with respect to the table when the operating surface of the tool is detected by the detector at least three times with an arbitrary time interval; obtaining an amount of deviation between each of positions measured and the reference position, storing the amount of deviation together with its respective time of measuring, and obtaining a function of a curve representing a relationship between a measuring time and an amount of deviation based on the obtained amount of deviation and the time of measuring; obtaining an estimated amount of deviation at a present time based on the obtained function. Since the amount of deviation can be estimated accurately based on the function of the curve representing the relationship between an amount of deviation and its time of measuring, an appropriate amendment is effected without repeatedly executing the measuring operation, so that a loss in machining time due to the repeated measuring operation can be reduced.

According to a second aspect of the invention, the deviation correcting method further comprises the steps of: measuring, at an arbitrary time, a relative position of the tool with respect to the table when the operating surface of the tool is detected by the detector; and obtaining an amount of deviation between the stored reference position and the measured position, storing the obtained amount of deviation together with its time of measuring, and obtaining a new function of a curve representing the relationship between a time of measuring and an amount of deviation, based on at least last three sets of the amount of deviation and the time of measuring, to update the present estimating function. With these additional steps, it is possible to change the function of the curve representing the relationship between an amount of deviation and its time of measuring to an appropriate one so as to meet the operating state of the machine tool and its environment.

According to a third aspect of the invention, an amount of deviation is measured again at an arbitrary time, and the measured value is stored together with the time of measuring. Then, a difference is obtained between the amount of deviation obtained by measurement and an amount of deviation which is estimated based on the function obtained in the initial setting operation. When the difference is equal to or smaller than a first predetermined value, subsequent measurement of an amount of deviation is not executed and the function of the curve is not updated to eliminate a waste of time due to unnecessary measuring operations.

Further, if the difference is within a range between the first predetermined value and a second predetermined value larger than the first predetermined value, it is considered that the amount of deviation varies continuously and there is a problem only in the function of the curve for estimating the variation of amount of deviation. Therefore, the existing measured data can flexibly cope with the position deviation caused by the temperature change during continuous operations, by updating the function of the curve based on the relationship between the last stored at least three sets of amount of deviation and the time of measuring. If the difference exceeds the second predetermined value, it is considered that there is a large variation in operating states of the machine tool, including the temperature change due to a stoppage of the machining operation and the exchange of the tool. Therefore, the position of the tool when the operating surface of the tool is detected by the detector is measured at least two more times at an arbitrary time interval, and the difference between the reference position and the measured position is stored together with the respective time of measuring. Then, a function of curve representing the relationship between an amount of deviation and its measuring time point is obtained and updated, based on the last stored at least three sets of the amount of deviation, i.e. the first amount of deviation when a large change is made in operating state and the subsequently measured at least two amounts of deviation, thus coping with the deviation created by the temperature change due to the stoppage of the machining operation and the change of the tool.

DETAILED DESCRIPTION OF THE PREFERRED EMBODIMENT

Figure 2:
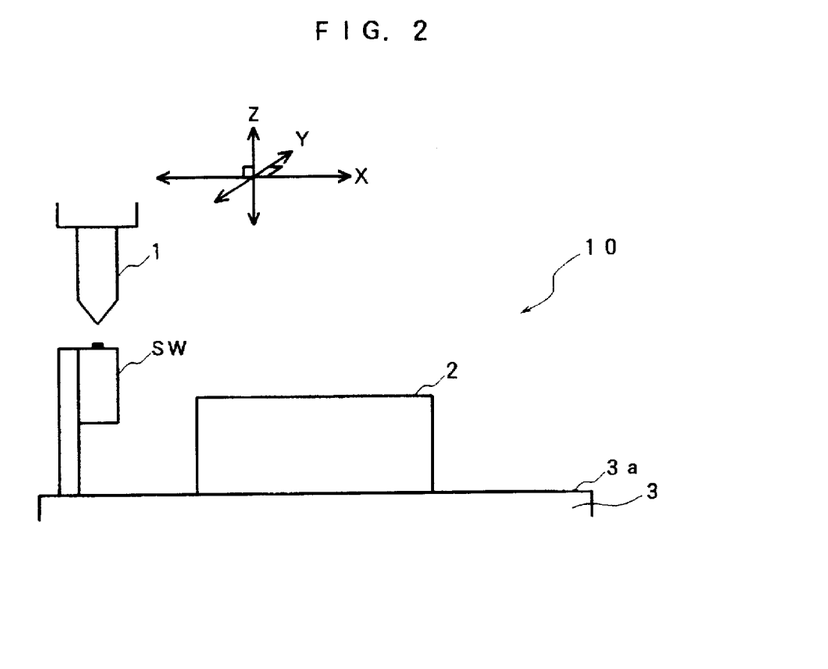
FIG. 2 is a diagram showing a main part of the machine tool controlled by the controller of FIG. 1.

A machine tool 10 as shown in FIG. 2 is a vertical milling machine provided with a table 3 and a tool 1 attached to a spindle. The table 3 has a workpiece-attaching surface 3a on which a workpiece 2 is mounted in an appropriate position by a magnetic chuck or other clamping means (not shown). At an appropriate position on the table 3, e.g., at a corner on an upper surface of the table 3, a detector switch SW is mounted for detecting an operating surface of the tool 1. The table 3 is moved relative to the tool 1 in a direction of each axis of a coordinate system X-Y-Z, which is set in the machine tool 10, by a servo motor (described below) of each axis in the machine tool 10 under the control of a controller 100.

Figure 1:
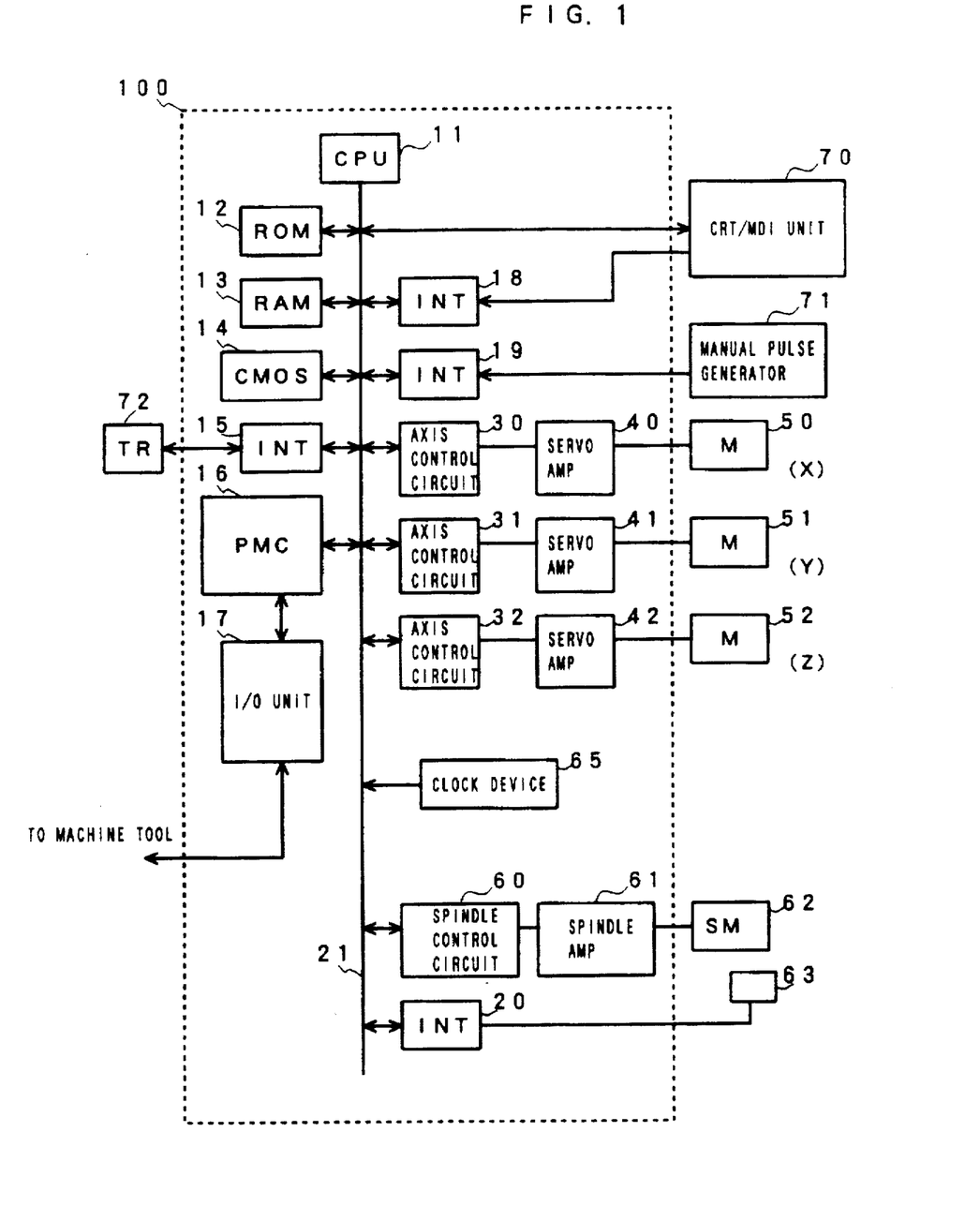
FIG. 1 is a block diagram showing a main part of a controller for a machine tool for carrying out the method of the present invention.

As shown in FIG. 1, a processor 11 generally controls the controller 100. The processor 11 reads a system program from a ROM 12 via a bus 21 and controls the controller 100 according to the system program. A RAM 13 stores temporary computation data, display data, and various data inputted by an operator via a CRT/MDI unit 70. A CMOS memory 14 is a nonvolatile memory backed up by a non-illustrated battery to retain the storage thereof even if a power source of the controller 100 is switched off. The CMOS memory 14 stores a machining program read via an interface 15 and a machining program inputted via the CRT/MDI unit 70. In a ROM 12, various system programs for executing an editing mode processing and for creating and editing the machining programs and an automatic operation mode processing are previously stored.

The interface 15 is provided for external equipments connected to the controller 100. External equipments 72, such as a paper tape reader, a paper tape puncher and an external storage device, are connected to the interface 15. The machining program is read from the paper tape reader or the external storage device, and the machining program edited in the controller 100 is outputted to the paper tape puncher and the external storage device.

A PMC (programmable machine controller) 16 controls auxiliary devices of the machine tool, e.g. an actuator of a robot hand for changing tools according to a sequence program loaded in the controller 100. The machining program is converted into signals necessary for the auxiliary devices by the sequence program according to the M function, S function and T function commanded by the machining program, and these signals are outputted to the auxiliary devices from an I/O unit 17. The actuators of the auxiliary devices operate based on these signals. Upon receipt of the signals from various switches of a control panel provided on a body of the machine tool 10, the PMC 16 transfers them to the processor 11 after executing the necessary processing.

Image signals of a present position of each axis of the machine tool 10, alarm, parameters, image data, etc. are sent to a CRT/MDI unit 70 and are displayed on its display. The CRT/MDI unit 70 is a manual data input device equipped with a display and a keyboard. An interface 18 receives data from the keyboard of the CRT/MDI unit 70 and transfers the data to the processor 11. An interface 19 is connected to a manual pulse generator 71 and receives pulses from the manual pulse generator 71. The manual pulse generator 71 is packaged in the operation panel of the machine tool 10 and is used in precisely positioning a movable part of the machine tool 10 by controlling each axis according to distributed pulses based on manual operation.

X, Y and Z axis control circuits 30–32 for moving the table 3 and the tool 1 of the machine tool 1 receives individual axis moving commands from the processor 11 and outputs them to servo amplifiers 40–42 to drive servo motors 50–52 for individual axes of the machine tool 10. A position detecting pulse coder is attached to each axis servo motor 50–52 so that position signals from the pulse coder are feedbacked as a pulse train. Alternatively, a linear scale may be used as the position detector. A speed signal is generated by a F/V (frequency-to-speed) conversion of the pulse train. In FIG. 1, the position signal feedback and speed feedback are not illustrated.

A spindle control circuit 60 receives a spindle rotating command to the machine tool 10 and outputs a spindle speed signal to a spindle amplifier 61. Upon receipt of the spindle speed signal, the spindle amplifier 61 rotates the spindle motor 62 of the machine tool 10 at a commanded rotational speed to drive the tool 1. A position coder 63 is connected to the spindle motor 62 by gears or a belt and outputs a feedback pulse in synchronism with the rotation of the spindle. The feedback pulse is read by the processor 11 via an interface 20. Reference numeral 65 designates a clock device adjusted to be synchronized with a current time. The detector switch SW supported on the table 3 of the machine tool 10 is connected to the I/O unit 17 so that an ON/OFF state of the detector switch SW is recognized by the processor 11 via the PMC 16.

The detector switch SW is designed to detect that an end operating surface of the tool 1 in a form of an end mill comes into contact with the switch in a direction of the Z axis. As occasion demands, there may be provided another switch SW' for detecting that the peripheral operating surface of the tool 1 comes into contact with it in a direction of the X axis and still another detector switch SW" for detecting that the peripheral operating surface of the tool 1 comes into contact with it in a direction of the Y axis. Since the number of detector switches is only a matter of design, the following embodiment is described with respect to the machine tool 10 provided with only one detector switch SW for detecting that the end machining surface of the tool 1 comes into contact with the switch SW in the direction of the Z axis.

Figure 4:
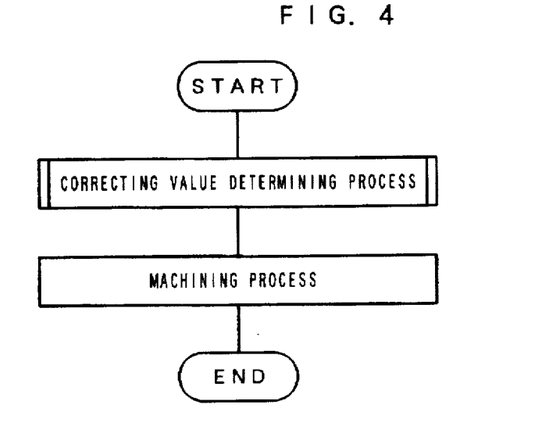
FIG. 4 is a flowchart showing a general processing to be executed by the controller according to the invention.

FIG. 4 is a flowchart showing a general processing routine to be executed by the processor 11. As shown in FIG. 4, in the deviation correcting method according to this embodiment, a correcting value determining process to obtain a function of a curve for estimating an amount of deviation and to calculate a correcting value based on the function, is executed each time before executing a machining program for a machining process, which is loaded from external equipment, such as a paper tape reader and a external storage, or from the CMOS memory 14. FIGS. 5 through 8 show the correcting value determining process in detail.

Figure 5:
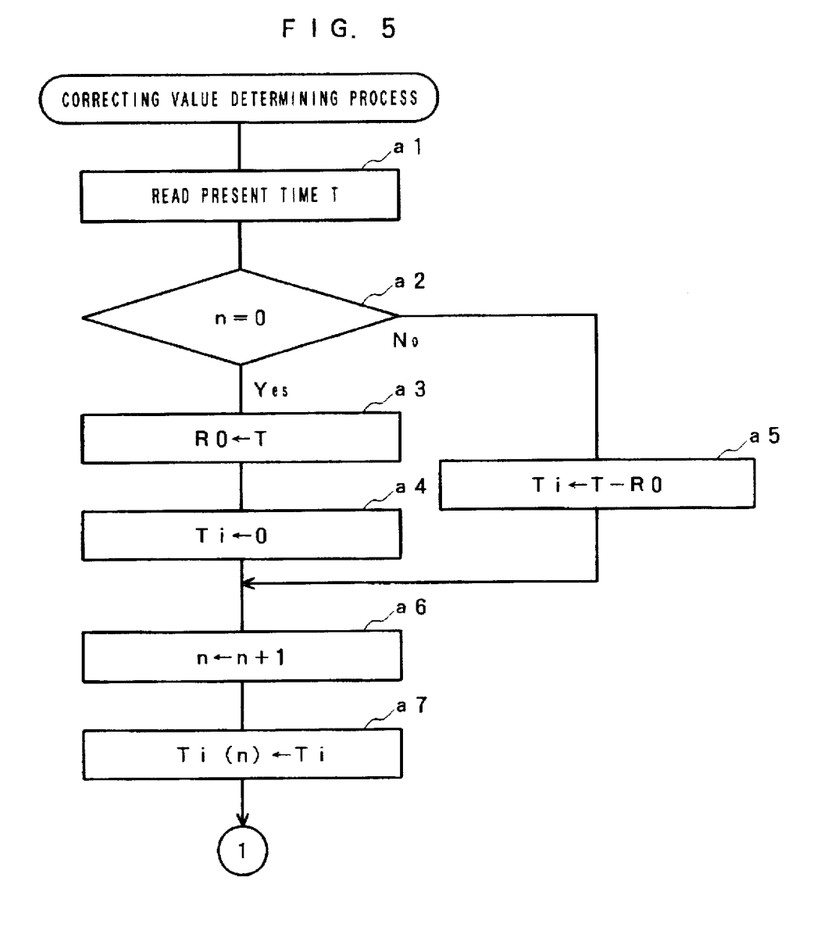
FIG. 5 is a flowchart showing a correcting value determining process to be executed by the controller.

The processor 11 having started the correcting value determining process prior to a first machining process reads a present time T from the clock device 65 (step a1) and discriminates whether or not the value of a number-of-times-of-execution integrating counter n for storing the number of times of execution of the correcting value determining process is "0" (step a2). Since the initial value of the counter n is "0", the result of discrimination at this stage is true, so that the processor 11 stores the present time T in an initial setting operation start time storage register R0 (step a3) and sets "0" in a lapsed-time temporary storage register Ti (step a4).

Then, the processor 11 increases the value of the number-of-times-of-execution integrating counter n (step a6) and sets, in accordance with the value of the counter n, the value of the lapsed-time temporary storage register Ti in a lapsed-time storage register Ti(n) for storing a lapsed time from a time when a first "measuring process" is executed to a time when an n-th "measuring process" is executed in an initial setting operation (step a7). In this specification, the "measuring process" means a process for detecting an amount of deviation as described later, and the "initial setting operation" means a general process necessary for calculating a function f(Ti) of a curve for estimating the deviation on the basis of data obtained by executing a predetermined number of times C of the "measuring process" at an arbitrary time interval.

Figure 7:
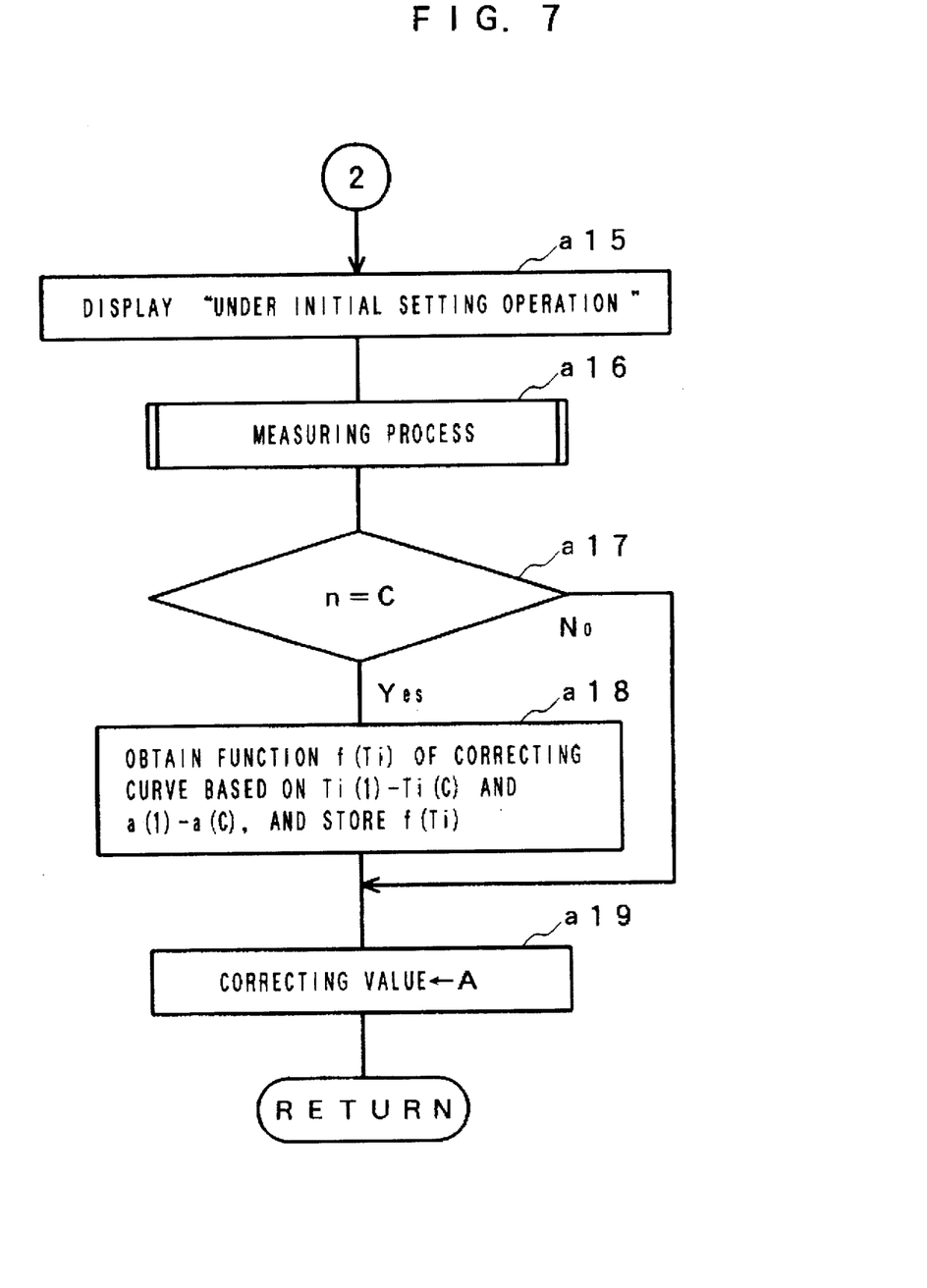
FIG. 7 is another continuation of the flowchart of the correcting value determining process.

Then, the processor 11 discriminates whether or not the value of the number-of-times-of-execution integrating counter n reaches the predetermined number of times C, which are required for calculating the function f(Ti). Namely, the processor discriminates whether or not the number of times of execution of the "measuring process" reaches the predetermined number of times C (step a8). If it does not reach C, the processor 11 commands to display a message such as "under initial setting operation" on the display of the CRT/MDI unit 70 (step a15), and the "measuring process" for obtaining an amount of deviation is started (step a16).

Figure 9:
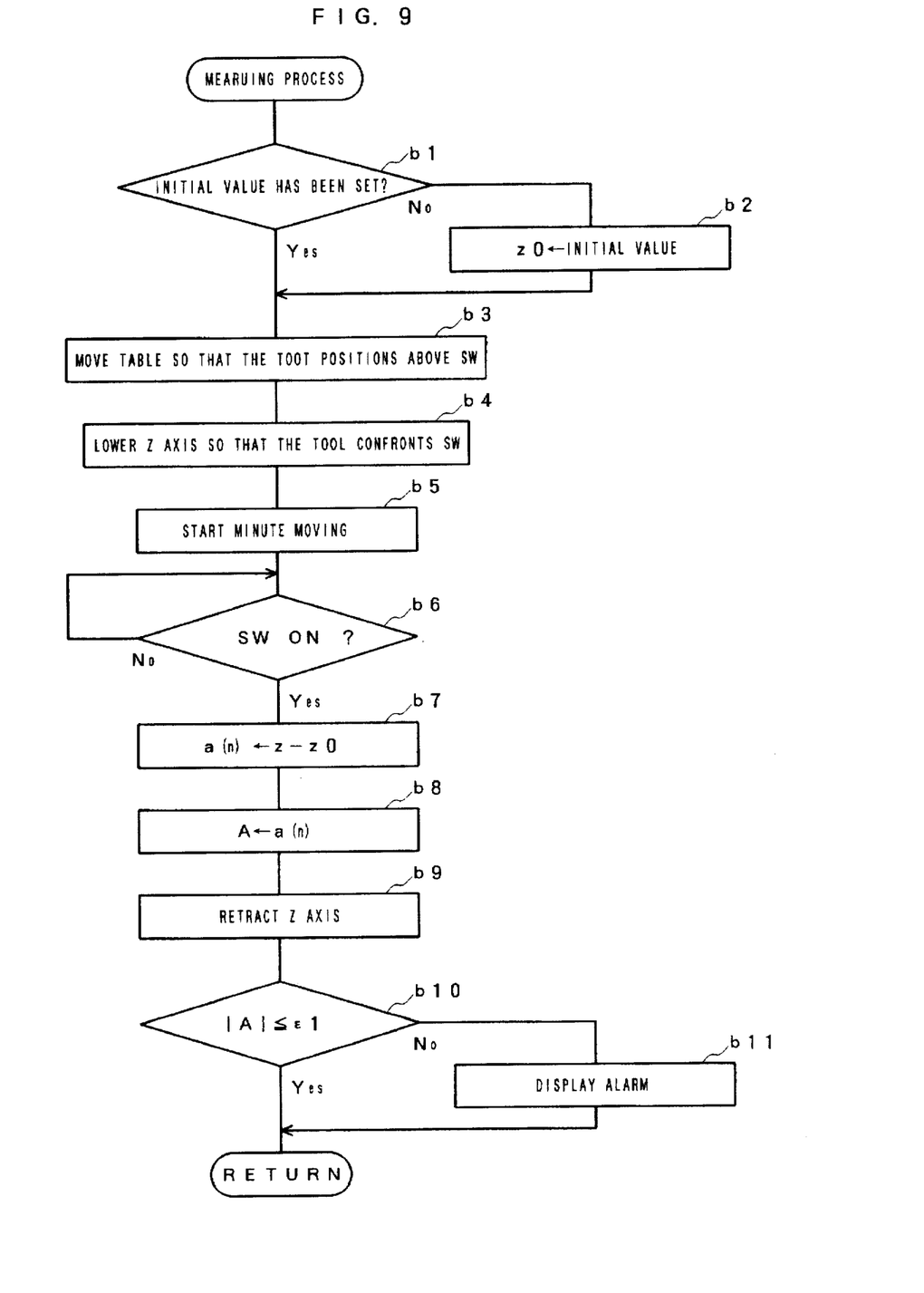
FIG. 9 is a flowchart showing a measuring process to be executed by the controller.

FIG. 9 shows the "measuring process" of step a16 in detail. The processor 11, having started the "measuring process", discriminates (step b1) whether an initial value of a reference position, which is an ideal value of the Z axis when the detector switch SW detects the end operating surface of the tool 1, is already set in the reference position storage register z0. If no reference position is set, a reference position in accordance with a size of the tool 1 presently on the machine tool 10 is read from the CMOS memory 14, and then its value is set in the reference position storage register z0 (step b2).

The "reference position" means a position on the Z axis in an absolute coordinate system when the detector switch SW detects the end operating surface of the tool 1 under such a condition that the workpiece can be accurately machined in size based on a machining program without effecting the deviation correction. Specifically, this position is set as a value on the Z axis when the detector switch SW detects the end operating surface of the tool 1 under a condition that the tool 1 is accurately mounted on the chuck of the machine tool 10 and the machine tool 10 is in a standard state in engineering, e.g., at 20° C. under the atmospheric pressure. In this embodiment, the absolute coordinate system is a mechanical coordinate system X-Y-Z set in the machine tool 10.

Then, the processor 11 drives the Z-axis servo motor 52 in a quick moving mode to retract the table 3 to a position where the tool 1 does not interfere with the workpiece 2, and then drives the X-axis and Y-axis servo motors 50 and 51 in a quick moving mode to move the table 3 relative to the tool 1 (step b3) to a position right above the detector switch SW. Further, the processor 11 drives the Z-axis servo motor 52 in the quick moving mode to bring the end operating surface of the tool 1 close to the reference position z0 (step b4), then forwards the tool 1 in the direction of Z axis (step b5) in a minute moving mode, whereupon the processor 11 waits for a signal indicating that the detector switch SW detects the end machining surface of the tool 1 (step b6).

Upon confirmation that the end operating surface of the tool 1 has come into contact with the detector switch SW (step b6), the processor 11 reads a present position z on the Z axis at that time, obtains a difference between the present position z and the reference position z0, and stores the value of this difference, as the amount of deviation detected by the n-th "measuring process" in an amount-of-deviation storage register a(n) in accordance with the value of the number-of-times-of-execution integrating counter n (step b7). The processor 11 then stores the amount of deviation temporarily in a measured correcting value storage register A (step b8) and drives the Z-axis servo motor 52 in the reverse direction to retract the tool 1 from the detector SW (step b9).

Then, the processor 11 discriminates (step b10) whether or not the amount A of deviation is within a tolerance ε1 (set value). If the amount A of deviation exceeds the tolerance ε1, the processor 11 commands to display an alarm message such as "there are possibilities of tool blade cutout, adhesion of foreign matter, misattachment, etc." on the display of the CRT/MDI unit 70 to call an operator's attention (step b11). At that time, the operator checks the display and does a necessary operation, such as changing of the tool 1 with new one, cleaning of the detector switch SW and the tool 1 and remounting of the tool 1, only when the tool blade cutout, adhesion of foreign matter, misattachment, etc. are founded. In the case of a minor attachment error in the axial direction of the tool, which does not cause a problem of detachment of the tool during operation, it is possible to correct the deviation in the "correcting value determining process" so that the operator may ignore the alarm message. Unless other abnormalities are detected, possible errors are caused by the thermal expansion or shrinkage and can therefore be corrected in the "correcting value determining process" like the minor attachment error.

Upon termination of one "measuring process", the processor 11 returns to a main program of FIG. 7 to discriminate (step a17) whether the value of the number-of-times-of-execution integrating counter n reaches a predetermined number of times C. If the value of the counter n does not reach the predetermined number of times C, the processor 11 stores, as a correcting value, the value of the amount of deviation currently stored in the measured correcting value storage register A and terminates the "correcting value determining process" (step a19). Then, as shown in FIG. 4, the processor 11 executes the "machining process" for a single machining program by making a correction based on this correcting value. Namely, if the machining program is given on an absolute coordinate system, the processor 11 makes the correction to the Z-axis moving position command given by the machining program by a correcting value A for each time. If the machining program is given on a relative coordinate system, the processor 11 makes the correction only to a first Z-axis moving position command given by the machining program by the correcting value A.

When the "machining process" for a single machining program is terminated, the processor 11 executes the "correcting value determining process" prior to the "machining process" for the next machining program in the same manner as above.

However, since in the second and following "correcting value determining process", the result of discrimination of step a2 is false, the processor 11 obtains a lapsed time from the time of execution of the first "measuring process" to the time of execution of the n-th "measuring process" in the initial setting operation, based on the present time T read from the clock device 65 in step a1 and the time stored in the initial setting operation start time storage register R0. Then, the processor 11 sets the obtained value in the lapsed-time temporarily storage register Ti (step a5), and stores the set value in the lapsed-time storage register Ti(n) in accordance with the value of the number-of-times-of-execution integrating counter n whose value is increased to meet the number of times of execution of the "measuring process" in the process of step a6 (step a7).

Thus, until it is discriminated that the value of the number-of-times-of-execution integrating counter n exceeds the predetermined number of times C at step a8 in the "correcting value determining process", the processor 11 successively stores in the lapsed-time storage register Ti(n) a lapsed time Ti from the time of execution of the first "measuring process" to the time of execution of the n-th "measuring process" in accordance with the value of the counter n in initial setting operation (steps a1, a2, a5, a6–a8). The processor 11 then obtains an amount of deviation A at each lapsed time Ti (n) and stores the amount of deviation A in an amount-of-deviation storage register a(n) in accordance with the value of the counter n (steps a15–a17). Then, the processor 11 stores the value of the amount of deviation presently stored in the measured correcting value storage register A (step a19) as the correcting value and executes the "machining process" according to the next machining program while making the correction based on this correcting value.

As a result, Ti(n) which represents a lapsed time Ti at n-th "measuring processes" from the time of the first "measuring process" and a(n) which represents the value of an amount of deviation A at the time Ti are stored in the initial setting operation.

Further, as the "correcting value determining process" and "machining process" are repeatedly executed, it is discriminated that the value of the number-of-times-of-execution integrating counter n has reached a predetermined number of times C to confirm that the "measuring process" has been executed C times, the processor 11 calculates a function f(Ti) of a curve for estimating an amount of deviation A' based on C sets of data having been measured and stored, i.e. successive lapsed times Ti(1)–Ti(C) and each value of corresponding deviation amount a(1)–a(c), and stored the function f(Ti) (step a18) to terminate the initial setting operation. Since the function f(Ti) is a function for representing a curve, it is necessary to perform the measuring process at least three times (C=3) for calculating the curve (in the case of arc interpolation). It is necessary to perform the measuring process more than three times (C>3) for obtaining a more precise function (in the case of other curve interpolation).

Figure 3A:
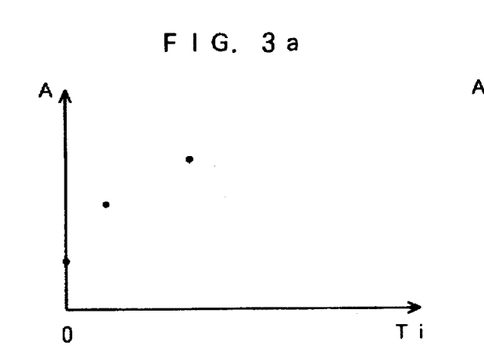
FIGS. 3a, 3b, 3c and 3d are graphs schematically showing a variation of an amount of deviation between a reference position and the measured positions in association with time of measurement.
Figure 3B:
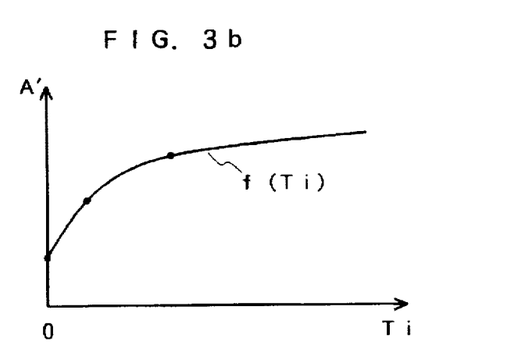

FIG. 3a is a graph showing an example of measured data when C=3 tentatively. Three sets of Ti(n) and a(n) are marked in plots representing the lapsed time Ti on the horizontal axis and the amount of deviation A on the vertical axis. Since the time period necessary to perform the "machining process" for a single machining program depends on the content thereof, the intervals of the plots on the Ti axis are not necessarily to be uniform (arbitrary time intervals). FIG. 3a shows an example where there is a very small error in attachment of the tool 1, or a temperature of the individual component of the machine tool 10 is different from the standard temperature at the time of starting the measurement. Therefore, when a lapsed time Ti is 0 at the time of the first "measuring process", z-z0 which is the value of a(1) is not 0. An arbitrary curve smoothly tracing C number of points as shown in FIG. 3b is a function f(Ti) of a curve for estimating the amount of deviation A' from the lapsed time Ti. After the function f(Ti) has been obtained, it is possible to estimate the amount of deviation A' at any time by substituting the lapsed time Ti from the time of execution of the first "measuring process", which is stored in the lapsed-time temporary storage register Ti, in f(Ti). However, because of fluctuations in ambient temperature or an operating condition of the machine tool 10, it is difficult to precisely estimate the value of amount of deviation over a long time based on the function f(Ti) calculated from the initially measured C sets of data. Thus, the processor 11 terminates the initial setting operation and then performs the following processing in the "correcting value determining process" after obtaining f(Ti).

The processor 11, having starting the next "correcting value determining process", obtains a lapsed time from the time of execution of the first "correcting value determining process" to the time of execution of the n-th (present) "correcting value determining process", sets the value of the lapsed time in the lapsed-time temporary storage register Ti, and stores the value of Ti in the lapsed-time storage register Ti(n) in accordance with the value of the number-of-times-of-execution integrating counter n (steps a1–a7). Then, the processor 11 discriminates whether or not the value of the number-of-times-of-execution integrating counter n exceeds the predetermined number of times C (step a8). When the previous "correcting value determining process" is terminated, n=C and as the value n is increased in the present "correcting value determining process", n>C. Therefore, the result of discrimination of step a8 is false.

The processor 11 obtains an estimated value A' of amount of deviation at the present time by substituting the present value of the lapsed-time temporary storage register Ti in the function f(Ti) and stores the estimated value in the estimated correcting value storage register A' (step a9), whereupon the processor 11 discriminates whether or not any additional measuring process should be executed (step a10). The necessity of execution of any additional measuring process is determined based on whether or not a flag is set in the CMOS memory 14. This flag is set or reset by the operator's discretion through the keyboard of the CRT/MDI unit 70. Immediately after completion of the initial setting operation for obtaining a function f(Ti), it is difficult to discriminate whether or not the function f(Ti) is appropriate for estimation of amount of deviation, and therefore, it is necessary to judge the appropriateness of the function f(Ti) by measuring a real amount of deviation A by the "measuring process" and comparing the real amount of deviation A with the estimated amount of deviation A'. Therefore, in general, since the operator does not set a flag for non-execution of additional measuring process immediately after completion of the initial setting operation, the result of discrimination of step a10 is true so that the processor 11 executes the "measuring process" of FIG. 9 in the same manner as above (step a11).

The processor 11, having measured the real amount of deviation A by the "measuring process", discriminates (step a12) whether or not the difference between the actually measured amount of deviation A and the amount of deviation A' estimated by the function f(Ti) is within a range of a first predetermined value ϵ2 (set value) (step a12). If the difference between the measured amount of deviation A and the estimated amount of deviation A' is within a range of a predetermined value ϵ2, an error between A and A' is within a tolerance limit. This means, at least at this time, it is appropriate to estimate the amount of deviation A' by the function f(Ti) obtained by the last initial setting operation. Accordingly, the processor 11 commands to display a message, such as "confirmed" on the display of the CRT/MDI unit 70 (step a13), to notify the operator that estimation by the function f(Ti) is appropriate. Namely, the operator is informed that the estimated amount of deviation A' equivalent to the real amount of deviation A can be obtained by the arithmetic process of step a9 without executing the "measuring process". Then, the processor 11 stores the obtained amount of deviation A' as the correcting value (step a14) and executes the following "machining process" by correcting the deviation in the same manner as above, based on this correcting value. When the operator confirms a message such as "confirmed" displayed in step a13 and sets a flag for non-execution of any additional measuring process through the keyboard of the CRT/MDI unit 70, the process of steps a11-a13 will not be executed in the subsequent "correcting value determining process", and the deviation will be corrected by the correcting value A' obtained based on the lapsed time Ti and the function f(Ti) at that time.

Figure 6:
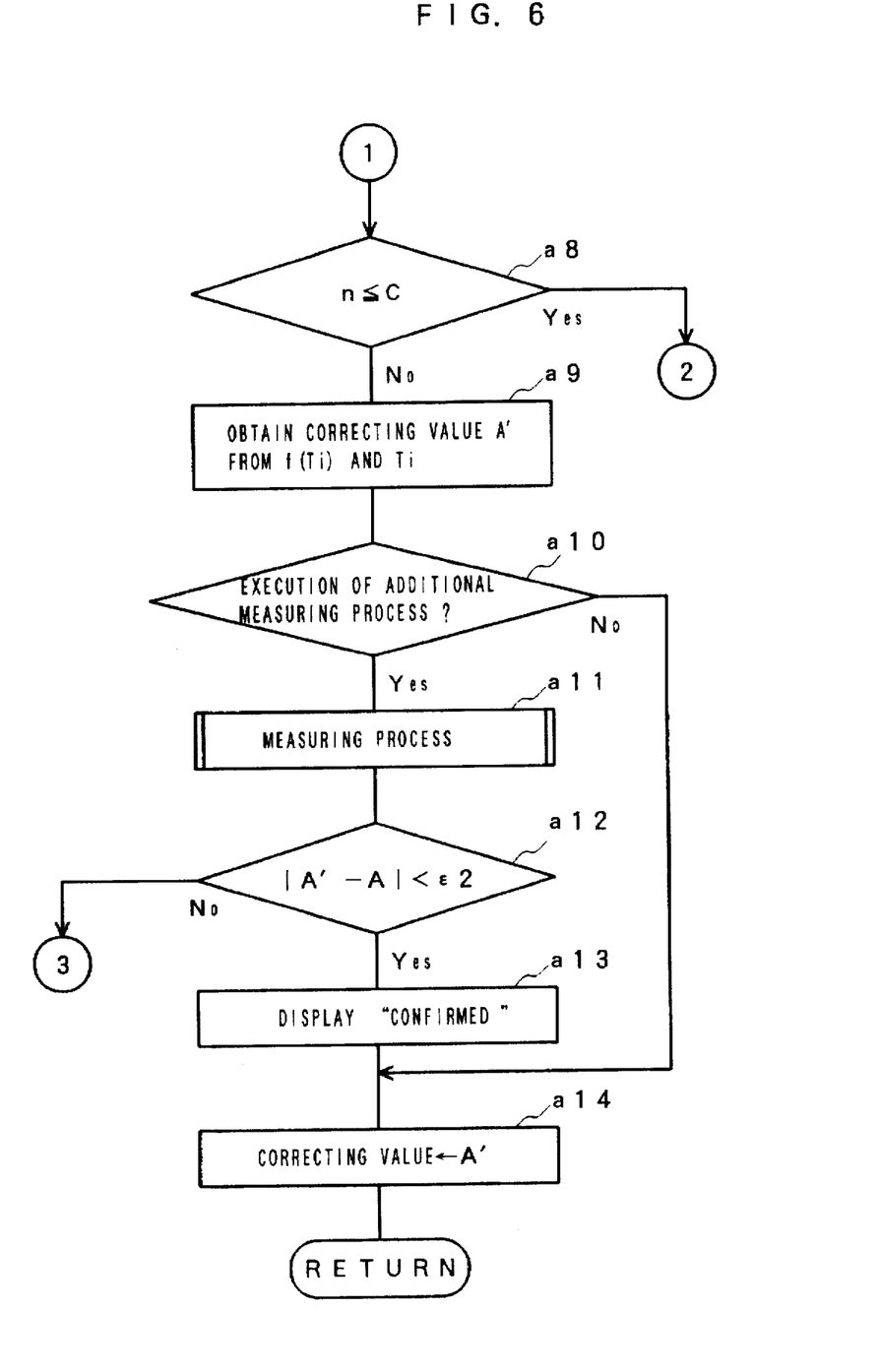
FIG. 6 is a continuation of the flowchart of the correcting value determining process.

On the other hand, when the result of discrimination of step a12 has been false, namely, the estimation of the amount of deviation A' based on the function f(Ti) obtained by the initial setting operation is judged not appropriate, the processor 11 further discriminates (step a20) whether or not the difference between the actually measured amount of deviation A and the amount of deviation A' estimated based on the function f(Ti) is within a range of a second predetermined value ϵ3 (set value). If the difference between the amount of deviation A and the amount of deviation A' is equal to or smaller than ϵ3, it means that there is not a large difference between the amount of deviation estimated by the function f(Ti) and the measured amount of deviation. Specifically, it is considered that a variation of the deviation is continuous without a long interruption of the operation of the machine tool 10 between the previous "measuring process" and the present "measuring process" and there has not been created a large positional variation due to thermal expansion or shrinkage of each component of the machine tool 10. There is a high possibility that an estimated function f(Ti) appropriate for the present condition can be calculated based on data of C sets of the time of measuring and amount of deviation which are measured and stored in the last "measuring process". Accordingly, the processor 11 calculates a new function f(Ti) for estimating an amount of deviation A' from a lapsed time Ti, likewise the process of step a18, based on C sets of data, i.e., the value of each of lapsed time Ti(n−C+1), Ti(n−C+2), . . . , Ti(n) and the value of each corresponding amount of deviation a(n−C+1), a(n−C+2), . . . , a(n), and updates and stores the function (step a21). Then, the processor 11 stores the amount of deviation A measured in step a11 as a correcting value (step a22) and executes the next "machining process", making the correction of deviation as above based on the correcting value.

Figure 3C:
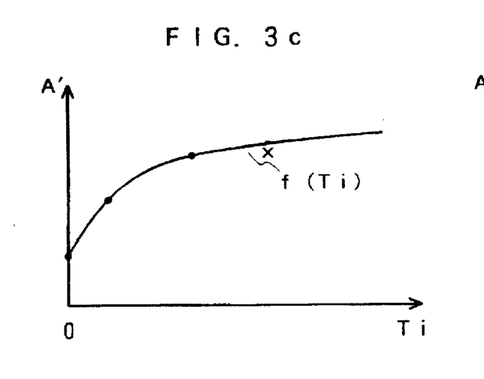

On the other hand, if the results of discrimination of all the steps a12 and a20 have been false, namely, if the difference between the amount of deviation A and the amount of deviation A' is equal to or larger than ϵ3, there is a large difference between the amount of deviation A' estimated from the function f(Ti) and the actually measured amount of deviation A. In this case, there is a possibility that a large positional change is created due to thermal shrinkage of each component of the machine tool 10 with a long interruption of operation of the machine tool 10 between the previous "measuring process" and the present "measuring process" or that there is a considerable positional error in mounting the tool 1. Therefore, it is not appropriate to obtain a new function f(Ti) using the past data detected before and after a long interruption or exchange of the tool 1, even if they are the data measured and stored in the last "measuring process". Such an example is shown in FIG. 3c. The curve of FIG. 3c is an estimated curve f(Ti) obtained by the last initial setting operation, and symbol x represent an amount of deviation actually measured by the present "measuring process". The symbol x is located off the estimated curve f(Ti) because of a large deviation due to an error in mounting the tool 1 or a long interruption.

Figure 8:
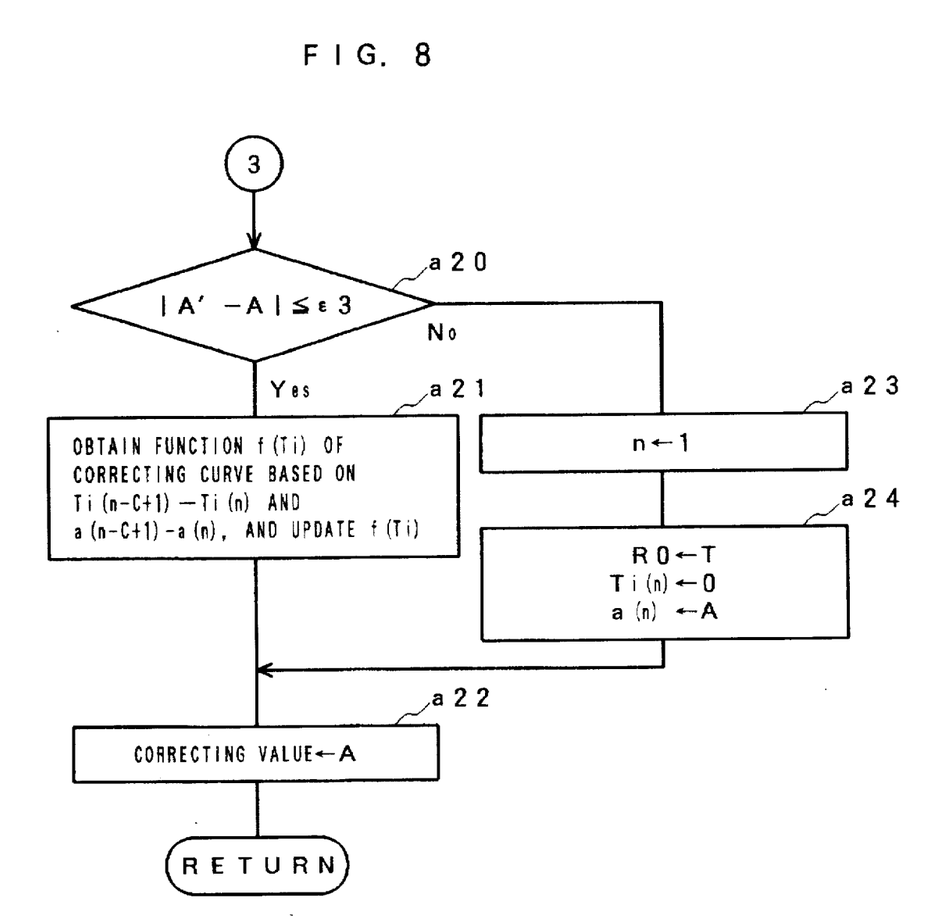
FIG. 8 is a further continuation of the flowchart of the correcting value determining process.

In such event, the processor 11 sets "1" in the number-of-times-of-execution integrating counter n (step a23) and sets the present time T in the initial setting operation start time storage register R0. The processor 11 also sets "0" in the lapsed-time storage register Ti(1) and sets the actually measured value A of the amount of deviation, which is measured in step a11, in the amount-of-deviation storage register a(1) (step a24), whereupon a new initial setting operation is started. Further, the processor 11 stores the amount of deviation A as a correcting value (step a22) and executes the next "operating process", effecting the correction of position as above based on the correcting value.

Figure 3D:
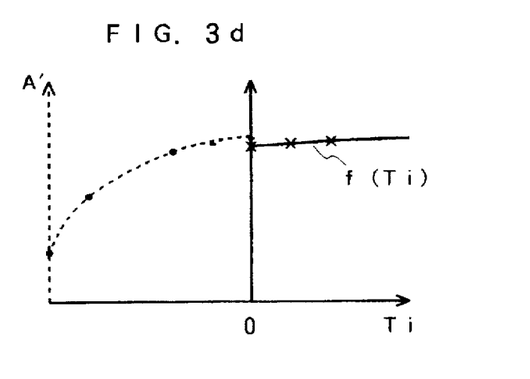

The data set in step a24 are the data detected right after occurrence of an attaching error of the tool 1 or right after an interruption of the machine tool 10, as indicated by symbol x in FIG. 3c. These data will be a leading set of data, Ti(1) and a(1), for obtaining a new function f(Ti) in a new initial setting operation that is to be started. It is a matter of course that Ti(1) is 0 and a(1) is the actually measured data of amount of deviation indicated by symbol x in FIG. 3c. These data are plotted in a graph of FIG. 3d. At this time, however, a new function f(Ti) of FIG. 3d are not yet obtained, and two symbol-x data located on the right side in FIG. 3d have not yet been measured.

When the result of discrimination of step a20 is false and the processing of-steps a23 and a24 is executed to start a new initial setting operation, the result of discrimination of step a2 will be false in the next "correcting value determining process" because "1" has already been set in the number-of-times-of execution integrating counter n. Then, T-R0, which is the lapsed time from the time of start of the new initial setting operation, will be set in the lapsed-time temporary storage register Ti (step a5). Subsequently, the processor 11 measures data, i.e. C sets of the lapsed time and amount of deviation from a lapsed time "0" when the new initial setting operation is started, in the same manner as the first-mentioned initial setting operation (see FIG. 3d), during which the correction is made by the actually measured value A. After the new estimating function f(Ti) conforming to the present condition is obtained and stored based on these data, an estimated value A' of amount of deviation is obtained from the new function f(Ti), and the same correction as above is performed (see FIG. 3d).

In the foregoing embodiment, as the simplest structural example, the machine tool 10 is equipped with only the detector switch SW for detecting that the end machining surface of the tool 1 comes into contact with the workpiece in the direction of the Z axis. In an alternative example in which the machine tool 10 is equipped with a second detector switch SW' for detecting that the peripheral operating surface of the tool 1 comes into contact with the workpiece in the direction of the X axis and a second detector switch SW" for detecting that the peripheral machining surface of the tool 1 comes into contact with the workpiece in the direction of the Y axis, the "measuring process" of FIG. 9 is performed in the direction of each axis with respect to the respective detector switch SW, SW', SW" to measure the amount of deviation for each axis Ax, Ay, Az, and the function of correcting curve for each axis f(Ti)x, f(Ti)y, f(Ti)z is obtained to perform the same process as above.

The reason why the reference position z0 is set according to the size of the tool 1 in the "measuring process" is to automatically discriminate whether or not there is any abnormality of the end machining surface of the tool 1, misattaching or adhesion of foreign matter by the discrimination of step b10. Accordingly, in the absence of such problem, as long as the end machining surface of the tool 1, which is longest in size, does not directly interfere with the detector switch SW while the tool 1 is moved forward in steps b3, b4, the value of the reference position z0 may be set arbitrarily or fixedly. Since a value of an amount of the deviation and a function of correcting curve are obtained according to the amount of correction A or A' from equation A=z−z0 of steps b7, b8, in such a manner that the end machining surface of the tool 1 actuates the detector switch SW, irrespective of the size of the tool 1, there would be created no inconvenience in correcting the deviation. In short, like the case that an excessive amount of deviation A was detected during continuous use of the same tool 1, if automatic exchange of tool is performed with the reference position z0 fixed, the result of discrimination of steps a12, a20 for each exchange, and additional C sets of data are obtained for each time point to update the correcting function f(Ti). However, in changing the tool 1 with another for each execution of the "machining process", extreme fluctuations are created in data due to difference in size of the tool 1 so that the process of step a18 would be inappropriate.

In this embodiment, since the reference position z0 according to the size of the tool 1 is used, only the deviation of the machine tool 10 can be detected as A=z−z0, irrespective of the size of the tool 1. It is therefore to cope adequately with repeated exchange of the tool 1.

Variation of size due to abrasion of the tool 1 is different from deviation due to heat expansion or heat shrinkage of the machine tool 10 itself. However, since abrasion of the tool i varies continuously and minutely like heat expansion and heat shrinkage, the method of the present invention can cope with the deviation due to abrasion of the tool. In this case, the estimated function f(Ti) will be a function for estimating an amount of deviation including abrasion of the tool.

In the foregoing embodiment, the operator discriminates whether or not execution of an additional measuring process is needed, and updates the setting of the flag in the CMOS memory 14 via the CRT/MDI unit 70. Alternatively, the lapsed time and the status of the machine tool may be discriminated by the controller 100 itself so that automatic discrimination can be made as to whether or not execution of an additional measuring process is needed.

If the lapsed time is confirmed to automatically discriminate whether execution of additional measuring processes is needed, it is particularly useful when an execution cycle storage register is provided to store the execution cycle of additional measuring processes, so that an appropriate initial value is previously set in the execution cycle storage register. Further, an execution time point storage register may be provided to update and store the time point when the program of the "correcting value determining process" is started; in the first "correcting value determining process" after the electric power is supplied to the machine tool, the present time point is stored in the execution time point storage register as an initial value. Subsequently, in the second or following "correcting value determining process", the present time is read from the clock device for each time and is compared with the time stored in the execution time storage register (i.e., the time of execution of the previous measuring process) to obtain a difference between the points in time. Then, the processor 11 discriminates whether or not the obtained difference exceeds the execution cycle stored in the execution cycle storage register, and if it exceeds, the processor 11 resets by force a flag of non-execution of additional measuring process in the CMOS memory 14 so that additional measuring processes subsequent to step a11 are executed, and the present time is updated and stored in the execution time storage register.

Once the flag of non-execution of additional measuring process has been reset, the measuring process is performed for every execution of the "correcting value determining process", irrespective of whether or not it has reached the execution cycle stored in the execution cycle storage register, thus causing a possibility that the whole machining time might be increased. Consequently, if the result of discrimination of step a12 is true, namely, if the function used at the current time point is regarded as appropriate, the flag of non-execution of additional measuring process is set again to prevent any unnecessary measuring process before it reaches the next execution cycle.

It is therefore possible to actually measure a correcting value for every predetermined execution cycle and to automatically discriminate whether or not the function being used at its time point is appropriate.

Instead of reading the present time from the clock device to obtain a difference from the previous execution time, an execution cycle may be set in a timer so that automatic discrimination can be made, for every predetermined execution cycle, as to whether or not the function being used in the present time point is appropriate.

In this event, at the time of start of the first "correcting value determining process", a time interval of execution cycles is set in the timer and starts the timer, and at the time of start of the second or following "correcting value determining process", the processor discriminates whether or not the operation of the timer terminates for each time. Only when the termination of operation of the timer is confirmed, the flag of non-execution of additional measuring process in the CMOS memory 14 is reset by force to perform the measuring process, in the same manner as above, so that an execution cycle is set again in the timer to restart the timer. As a result, in the same manner as above, a correcting value can be actually measured for every predetermined execution cycle, and it can be automatically discriminated whether or not the function being used at that time point is appropriate.

Further, for automatically discriminating the necessity of execution of additional measuring process by checking the status of the machine tool, the PMC 16 discriminates the ON state of the power source, and then at the start of the program of the first "correcting value determining process" with the power source switched on, the flag of non-execution of additional measuring process in the CMOS memory 14 is reset by force, whereupon the measuring process subsequent to step a11 is executed.

According to the foregoing procedure, it is possible to execute by force an additional measuring process when the power source is switched off as the machine tool is interrupted for a long time, and it is also possible to automatically discriminate whether or not the function being used at that time point is appropriate.

Thus, it is possible to prevent any setting error by the operator so that a more precise correcting process can be achieved.

According to the deviation correcting method of the present invention, even when a variation of size and a bend is generated in an individual component of the machine tool due to the thermal expansion or shrinkage, it is possible to correct a deviation without repeatedly executing the measuring process so that the whole machining time can be reduced. Further, by updating a function of a curve representing a relationship between the time and the amount of deviation by executing the remeasuring process, it is possible to correct the deviation precisely. Since the appropriateness of estimation by the function is discrimination from whether or not the difference between the measured amount of deviation and the estimated amount of deviation is equal to or smaller than a first predetermined value, and the measuring process terminated at the time when an optimum function for estimation is obtained is terminated, it is possible to eliminate a waste of time due to any unnecessary measuring process. Further, if the difference is within the range between the first predetermined value and a second predetermined value larger than the first predetermined value, the function for estimating the amount of deviation is corrected using effectively data measured by that time. If the difference increases to exceed the second predetermined value, it is deemed that a large variation is created in operating status of the machine tool and the variation of data of amount of deviation is not continuous, and new data are measured to obtain a new function for estimating the amount of deviation. Therefore, the estimation of amount of deviation can be achieved precisely.

What is claimed is:

1. A method of correcting a deviation of a reference position of a tool with respect to a workpiece mounted on a table of a machine tool, comprising the steps of:

(a) providing a detector for detecting an operating surface of said tool on said table;

(b) measuring a relative position of said tool with respect to said table widen the operating surface of said tool is detected by said detector under a predetermined standard condition and storing the measured position as a reference position;

(c) measuring a relative position of the tool with respect to the table when the operating surface of said tool is detected by said detector at least three times with an arbitrary time interval;

(d) obtaining an amount of deviation between each of positions measured in said step (c) and said reference position stored in said step (b), storing said amount of deviation together with its respective time of measuring, and obtaining a function of a curve representing a relationship between a time of measuring and an amount of deviation based on said obtained amount of deviation and said stored time of measuring;

(e) obtaining an estimated amount of deviation at a present time based on said function obtained in said step (d); and (f) correcting a commanded position of the tool based on said estimated amount of deviation obtained in said step (e).

2. A method of correcting a deviation of a reference position of a tool with respect to a workpiece mounted on a table of a machine tool, comprising the steps of:

(a) providing a detector for detecting an operating surface of said tool on said table;

(b) measuring a relative position of said tool with respect to said table when the operating surface of said tool is detected by said detector under a predetermined standard condition and storing the measured position as a reference position;

(c) measuring a relative position of the tool with respect to the table when the operating surface of said tool is detected by said detector at least three times with an arbitrary time interval;

(d) obtaining an amount of deviation between each of positions measured in said step (c) and said reference position stored in said step (b), storing said amount of deviation together with its respective time of measuring, and obtaining a function of a curve representing a relationship between a time of measuring and an amount of deviation based on said obtained amount of deviation and said stored time of measuring;

(e) obtaining an estimated amount of deviation at a present time based on said function obtained in said step (d);

(f) correcting a commanded position of the tool based on said estimated amount of deviation obtained in said step (e);

(g) measuring, at an arbitrary time, a relative position of said tool with respect to said table when the operating surface of said tool is detected by said detector; and (h) obtaining an amount of deviation between said reference position stored in said step (b) and said position measured in said step (g), storing said amount of deviation together with its time of measuring, and obtaining a function of a curve representing the relationship between a time of measuring and an amount of deviation, based on at least last three sets of said amount of deviation and said time of measuring, to update said function obtained in step (d).

3. A method of correcting a deviation of a reference position of a tool with respect to a workpiece mounted on a table of a machine tool, comprising the steps of:

(a) providing a detector for detecting an operating surface of said tool on said table;

(b) measuring a relative position of said tool with respect to said table when the operating surface of said tool is detected by said detector under a predetermined standard condition and storing the measured position as a reference position;

(c) measuring a relative position of the tool with respect to the table when the operating surface of said tool is detected by said detector at least three times with an arbitrary time interval;

(d) obtaining an amount of deviation between each of positions measured in said step (c) and said reference position stored in said step (b), storing said amount of deviation together with its respective time of measuring, and obtaining a function of a curve representing a relationship between a time of measuring and an amount of deviation based on said obtained amount of deviation and said stored time of measuring;

(e) obtaining an estimated amount of deviation at a present time based on said function obtained in said step (d);

(f) correcting a commanded position of the tool based on said estimated amount of deviation obtained in said step (e);

(g) measuring, at an arbitrary time, a relative position of said tool with respect to said table when the operating surface of said tool is detected by said detector;

(h) obtaining an estimated amount of deviation at said time of measuring in said step (g) based on said function obtained in said step (d);

(i) obtaining an amount of deviation between said reference position stored in said step (b) and said position measured in said step (g);

(j) obtaining a difference between said estimated amount of deviation obtained in said step (h) and said amount of deviation stored in said step (i); and (k) when said difference obtained in step (j) is equal to or smaller than a first predetermined value, correcting the commanded position of said tool based on said estimated amount of difference obtained in said step (h), and when said difference obtained in said step (j) exceeds said first predetermined value, newly obtaining a function of a curve representing a relationship between an amount of deviation and its time of measuring based on said last stored at least three sets of amounts of deviation and said time of measuring, to update said function obtained in said step (d) and correcting the commanded position of said tool based on said amount of deviation stored in said step (i).

4. A method of correcting a deviation of a reference position of a tool with respect to a workpiece mounted on a table of a machine tool, comprising the steps of:

(a) providing a detector for detecting an operating surface of said tool on said table;

(b) measuring a relative position of said tool with respect to said table when the operating surface of said tool is detected by said detector under a predetermined standard condition and storing the measured position as a reference position;

(c) measuring a relative position of the tool with respect to the table when the operating surface of said tool is detected by said detector at least three times with an arbitrary time interval;

(d) obtaining an amount of deviation between each of positions measured in said step (c) and said reference position stored in said step (b), storing said amount of deviation together with its respective time of measuring, and obtaining a function of a curve representing a relationship between a time of measuring and an amount of deviation based on said obtained amount of deviation and said stored time of measuring;

(e) obtaining an estimated amount of deviation at a present time based on said function obtained in said step (d);

(f) correcting a commanded position of the tool based on said estimated amount of deviation obtained in said step (e);

(g) measuring, at an arbitrary time, a relative position of said tool with respect to said table when the operating surface of said tool is detected by said detector;

(h) obtaining an estimated amount of deviation at said time of measuring in said step (g) based on said function obtained in said step (d);

(i) obtaining an amount of deviation between said reference position stored in said step (b) and said position measured in said step (g);

(j) obtaining a difference between said estimated amount of deviation obtained in said step (h) and said amount of deviation stored in said step (i); and (k) when said difference obtained in said step (j) is within a range between a first predetermined value and a second predetermined value larger than said first predetermined value, newly obtaining a function of a curve representing a relationship between the amount of deviation and its time of measuring based on last stored at least three set of said amount of deviation and said time of measuring to update said function obtained in said step (d), and when said amount of deviation obtained in said step (j) exceeds said second predetermined value, measuring additionally at least two times a relative position of said tool with respect to said table when the operating surface of said tool is detected by said detector at an arbitrary time intervals, storing an amount of deviation between said reference position and said measured position with its time of measuring, and newly obtaining a function of a curve representing the relationship between an amount of deviation and its time of measuring, based on the last stored at least three sets of said amount of deviation and said time of measuring to update said function obtained in said step (d).

5. A method of correcting a deviation of a reference position of a tool with respect to a workpiece mounted on a table of a machine tool, comprising:

detecting an operating surface of said tool on said table;

measuring a relative position of said tool with respect to said table when the operating surface of said tool is detected in said detecting step under a predetermined condition and storing the measured position as a reference position;

measuring a relative position of the tool with respect to the table when the operating surface of said tool is detected at least three times at arbitrary time intervals;

obtaining an amount of deviation between each of the positions measured in the second measuring step and said reference position, storing said amount of deviation together with its respective time of measuring, and obtaining a function of a curve representing a relationship between a time of measuring and the amount of deviation;

correcting a desired position of the tool based on the function obtained in the obtaining step.

* * * * *